(12) United States Patent
Huang et al.

(10) Patent No.: US 11,763,102 B2
(45) Date of Patent: *Sep. 19, 2023

(54) METHOD AND DEVICE FOR PROCESSING A MULTI-LANGUAGE TEXT

(71) Applicant: EMC IP HOLDING COMPANY LLC, Hopkinton, MA (US)

(72) Inventors: Kun Wu Huang, Shanghai (CN); Winston Lei Zhang, Shanghai (CN); Chao Chen, Shanghai (CN); Jingjing Liu, Shanghai (CN); Duke Hongtao Dai, Shanghai (CN)

(73) Assignee: EMC IP Holding Company, LLC, Hopkinton, MA (US)

( * ) Notice: Subject to any disclaimer, the term of this patent is extended or adjusted under 35 U.S.C. 154(b) by 384 days.

This patent is subject to a terminal disclaimer.

(21) Appl. No.: 17/186,551

(22) Filed: Feb. 26, 2021

(65) Prior Publication Data

US 2021/0182506 A1 Jun. 17, 2021

Related U.S. Application Data

(63) Continuation of application No. 15/628,962, filed on Jun. 21, 2017, now Pat. No. 10,936,829.

(30) Foreign Application Priority Data

Jun. 21, 2016 (CN) .......................... 201610454208.X

(51) Int. Cl.
| | | |
|---|---|---|
| *G10L 15/26* | (2006.01) | |
| *G06F 40/58* | (2020.01) | |
| *G06F 16/951* | (2019.01) | |
| *G06F 40/53* | (2020.01) | |
| *G06F 40/263* | (2020.01) | |

(52) U.S. Cl.
CPC ............ *G06F 40/58* (2020.01); *G06F 16/951* (2019.01); *G06F 40/263* (2020.01); *G06F 40/53* (2020.01)

(58) Field of Classification Search
None
See application file for complete search history.

(56) References Cited

U.S. PATENT DOCUMENTS

| | | |
|---|---|---|
| 5,963,265 A | 10/1999 | Bae et al. |
| 6,920,461 B2 | 7/2005 | Hejlsberg et al. |
| 9,092,792 B2 | 7/2015 | Veres et al. |

(Continued)

OTHER PUBLICATIONS

Non-Final Office Action issued in related U.S. Appl. No. 15/628,962 dated Jul. 12, 2018; 16 pages.

(Continued)

*Primary Examiner* — Neeraj Sharma
(74) *Attorney, Agent, or Firm* — Brian J. Colandreo; Heath M. Sargeant; Holland & Knight LLP

(57) ABSTRACT

Embodiments of the present disclosure provide a method and apparatus for processing a multi-language text. According to embodiments of the present disclosure, the multi-language text including contents in a plurality of languages may be encoded with a Unicode. The method further comprises splitting the multi-language text into a plurality of parts based on the Unicode of the multi-language text, contents of the plurality of parts having different languages. In addition, the multi-language text may also be processed based on the plurality of parts.

20 Claims, 9 Drawing Sheets

(56) References Cited

U.S. PATENT DOCUMENTS

| | | | |
|---|---|---|---|
| 10,140,101 B2 | 11/2018 | Allen et al. | |
| 10,157,180 B2 | 12/2018 | Zhu | |
| 10,936,829 B2 | 3/2021 | Huang et al. | |
| 2002/0112078 A1* | 8/2002 | Yach | G06F 16/9577 709/219 |
| 2003/0036911 A1 | 2/2003 | Morin | |
| 2004/0194072 A1* | 9/2004 | Venter | G06F 8/427 717/114 |
| 2004/0237046 A1 | 11/2004 | Burchall et al. | |
| 2005/0172018 A1 | 8/2005 | Devine et al. | |
| 2005/0195171 A1 | 9/2005 | Aoki et al. | |
| 2005/0207442 A1 | 9/2005 | Zoest et al. | |
| 2005/0246716 A1 | 11/2005 | Smith et al. | |
| 2005/0289109 A1 | 12/2005 | Arrouye et al. | |
| 2006/0184357 A1* | 8/2006 | Ramsey | G06F 40/263 704/9 |
| 2006/0265705 A1 | 11/2006 | Holt | |
| 2007/0157171 A1* | 7/2007 | Eastham | G06F 8/71 717/121 |
| 2008/0127091 A1* | 5/2008 | Ericsson | G06F 9/454 717/123 |
| 2008/0243478 A1 | 10/2008 | Cohen et al. | |
| 2008/0243490 A1 | 10/2008 | Bush et al. | |
| 2008/0320457 A1 | 12/2008 | King et al. | |
| 2010/0146491 A1 | 6/2010 | Hirano et al. | |
| 2012/0253786 A1 | 10/2012 | Al-Omari et al. | |
| 2012/0290330 A1 | 11/2012 | Coleman et al. | |
| 2015/0234805 A1 | 8/2015 | Caswell | |
| 2016/0034261 A1 | 2/2016 | Nathan et al. | |
| 2016/0299982 A1 | 10/2016 | Bhave et al. | |
| 2016/0335255 A1 | 11/2016 | Alhamed et al. | |
| 2017/0116260 A1* | 4/2017 | Chattopadhyay | G06F 16/243 |
| 2017/0250771 A1 | 8/2017 | Deshpande | |

OTHER PUBLICATIONS

Final Office Action issued in related U.S. Appl. No. 15/628,962 dated Mar. 27, 2019; 18 pages.
Final Office Action issued in related U.S. Appl. No. 15/628,962 dated Jan. 15, 2020; 19 pages.
Notification of First Chinese Office Action issued in related Chinese Application Serial No. 201610454208 dated Jan. 20, 2020, 11 pages.
Notice of Allowance issued in related U.S. Appl. No. 15/628,962 dated Mar. 30, 2020; 15 pages.
Notification of Second Chinese Office Action issued in related Chinese Application No. 201610454208 dated Sep. 29, 2020, 9 pages.
Notice of Allowance issued in related U.S. Appl. No. 15/628,962 dated Dec. 23, 2020; 22 pages.
Non-Final Office Action issued in related U.S. Appl. No. 15/628,962 dated Jul. 25, 2019.
Notification of Third Chinese Office Action dated May 8, 2021 in related Application No. 201610454208.

* cited by examiner

METHOD AND DEVICE FOR PROCESSING A MULTI-LANGUAGE TEXT

RELATED APPLICATIONS

The subject application is a continuation application of U.S. Patent Application with Ser. No. 15/628,962, filed Jun. 21, 2017, this application claim priority from Chinese Patent Application Number CN201610454208.X, filed on Jun. 21, 2016 at the State Intellectual Property Office, China, titled "METHOD AND DEVICE FOR PROCESSING A MULTI-LANGUAGE TEXT" the contents of which is herein incorporated by reference in its entirety.

FIELD

Embodiments of the present disclosure generally relate to the field of searching, and more specifically, to a method and device for processing a multi-language text.

BACKGROUND

With the growth of internationalization, multiple language search becomes more and more important but it is also a big challenge. For example, Enterprise Search System currently detects language based on the front part of the whole text and uses the detected dominant language to process linguistics. Therefore, users who have documents in multiple languages failed to hit expected documents in searching because the content of interests in those documents are not handled with a corresponding language but another language in those documents. This issue is very common for our Chinese-Japanese-Korean (CJK) users because they have multiple official languages in their daily work. The above issue also exists in multi-language texts in any other environments furthermore Enterprise Search System.

SUMMARY

To solve the above and other potential problems, embodiments of the present disclosure provide a method and device for processing a multi-language text.

According to a first aspect of the present disclosure, a method for processing a multi-language text is provided. The method comprises encoding the multi-language text with a Unicode, the multi-language text including contents in a plurality of languages. The method further comprises splitting the multi-language text into a plurality of parts based on the Unicode of the multi-language text, contents of the plurality of parts having different languages. In addition, the method further comprises processing the multi-language text based on the plurality of parts.

According to a second aspect of the present disclosure, an electronic device is provided. The device comprises at least one processing unit and at least one memory. The at least one memory is coupled to the at least one processing unit and stores instructions executable by the at least one processing unit. The instructions, when executed by the at least one processing unit, cause the device to: encode a multi-language text with a Unicode, the multi-language text including contents in a plurality of languages; split the multi-language text into a plurality of parts based on the Unicode of the multi-language text, contents of the plurality of parts having different languages; and process the multi-language text based on the plurality of parts.

According to a third aspect of the present disclosure, a computer program product is provided. The computer program product is tangibly stored on a non-transient computer-readable medium and comprises machine-executable instructions, which, when executed, cause a machine to implement any actions of the method according to the first aspect of the present disclosure.

With the following description, it will be appreciated that embodiments of the present disclosure have the advantage of splitting a multi-language text of a document into a plurality of parts by language prior to linguistic processing, such that contents in each part of the multi-language text have a same language and thus a corresponding language may be employed to process each part. Therefore, embodiments of the present disclosure can improve linguistic processing quality of the multi-language text and enhances hit-rate of searching.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The above and other objectives, features and advantages of the present disclosure will become more apparent from more detailed description of some embodiments of the present disclosure with reference to the accompanying drawings, in which the same reference symbols are used to indicate the same elements.

DETAILED DESCRIPTION OF EMBODIMENTS

Some preferable embodiments will be described in more detail with reference to the accompanying drawings, in which the preferable embodiments of the present disclosure have been illustrated. However, the present disclosure can be implemented in various manners, and thus should not be construed to be limited to the embodiments disclosed herein. Rather, those embodiments are provided for thorough and complete understanding of the present disclosure, and completely conveying the scope of the present disclosure to those skilled in the art.

The term "comprise" and its variations used in the present disclosure mean comprising in an open-ended sense, i.e. "include without limitation". Unless otherwise specified, the term "or" means "and/or". The term "based on" means "at least partially based on". The terms "one exemplary embodiment" and "one embodiment" represent "at least one embodiment"; the term "another embodiment" represents "at least one another embodiment". The terms "first", "second" and the like may refer to different or the same objects. Other explicit and implicit definitions might further be included in the following description.

The resources searched in a search system, such as Enterprise Search System, may be in different types. As described above, multiple language search becomes more and more important in a search system but it is also a big challenge. A content processing module in the search system currently detects language based on the front part of the whole text and uses the detected dominant language to process linguistics. Therefore, users who have documents in multiple languages failed to hit expected documents in searching because those documents are not handled with a corresponding language but another language in those documents. This issue is very common for users who constantly use multiple official languages.

In order to at least partially solve the above and other potential problems, example embodiments of the present disclosure offer a solution for processing a multi-language text. The solution splits a multi-language text of a document into a plurality of parts by language prior to linguistic processing, such that contents in each part of the multi-language text have a same language and thus a corresponding language may be employed to process each part. Therefore, embodiments of the present disclosure can improve linguistic processing quality of the multi-language text and enhances hit-rate of searching.

Figure 1:
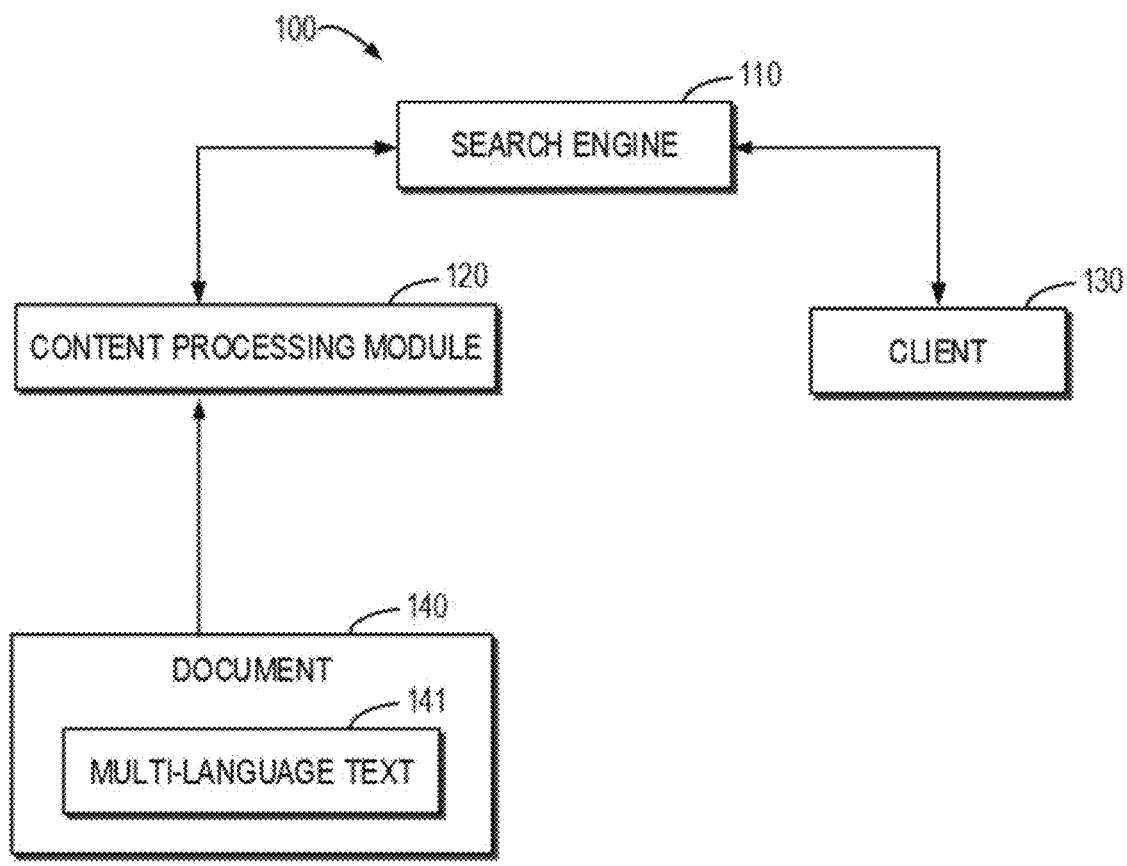
FIG. 1 shows a block diagram of an environment for processing a multi-language text in which embodiments of the present disclosure may be implemented.

FIG. 1 shows a block diagram of an environment 100 for processing a multi-language text in which embodiments of the present disclosure may be implemented. It should be understood that the structure and function of the environment 100 are described merely for illustrative purpose instead of implying any limit to the scope of the present disclosure. Embodiments of the present disclosure can be embodied in different structures and/or functions.

As shown in FIG. 1, the environment 100 can comprise: a search engine 110, a content processing module 120, a client 130 and a plurality of documents 140. The client 130 can send a search request for a certain keyword to the search engine 110. In response to the search request from the client 130, the search engine 110 provides a search result to the client 130 based on a processing result of the plurality of documents 140 in the content processing module 120, wherein the search result comprises a list of documents containing the keyword. The content processing module 120 can obtain text contents from media files (which are collectively known as "documents" herein, e.g., documents 140) and perform linguistic processing on the obtained text contents.

Figure 2A:
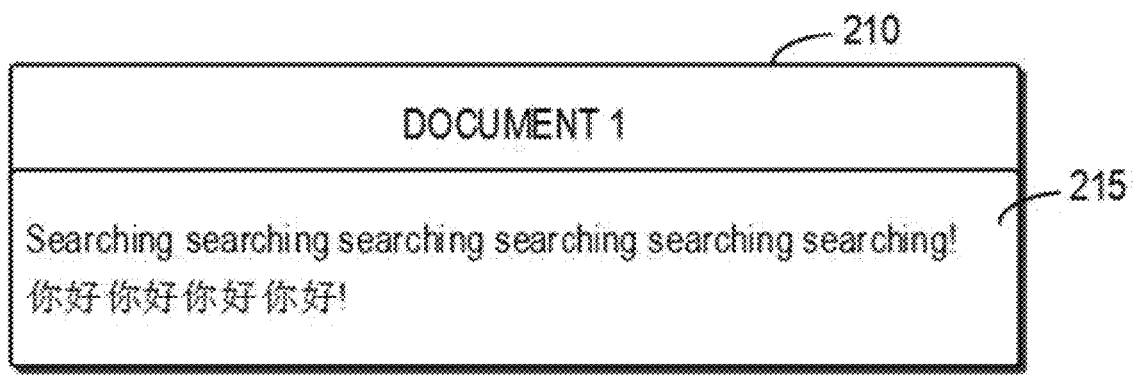
FIG. 2A and FIG. 2B show schematic diagrams of two documents including multi-language texts.
Figure 2B:
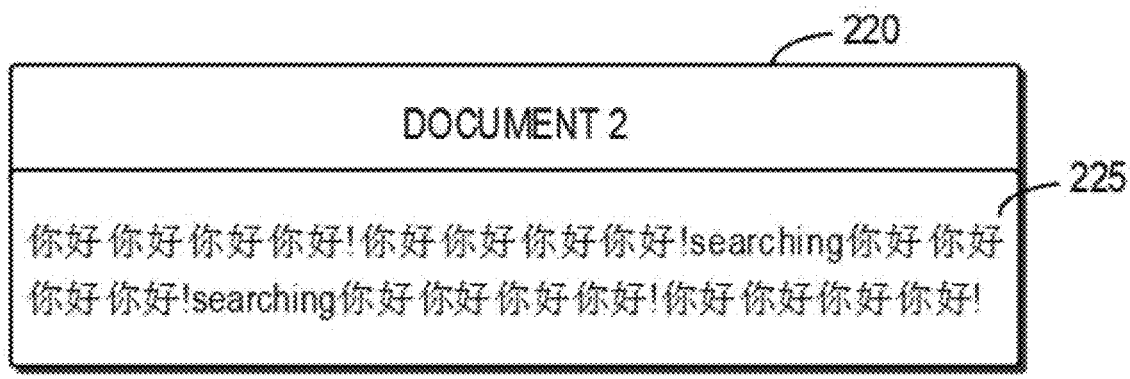

The plurality of searched documents 140 can comprise a multi-language text 141, which includes contents in a plurality of languages. FIGS. 2A-2B show schematic diagrams of two documents including multi-language texts. Content 215 of document 1 210 in FIG. 2A has an English front part and a Chinese latter part while content 225 of document 2 220 in FIG. 2B has a majority part of Chinese with English embedded.

Traditionally, the content processing module 120 detects language based on the front part of the whole text and uses the detected language to process linguistics on the whole text, resulting in that the linguistic analysis on text parts with other languages cannot be accurately performed. Specifically speaking, in the example shown in FIG. 2A, a language of the content 215 of the document 1 210 will be detected as English and the Chinese characters in the content 215 will also be processed using English rules consequently, which means the Chinese characters will be tokenized with space or punctuation. Therefore, a Chinese sentence will be tokenized as a term. In this case, if the client 130 searches 你好 the search engine 110 will return an empty search result. This is because that the language of the document 1 210 is detected as English, Chinese characters in the content 215 will be tokenized using English rules instead of Chinese grammar, and the term 你好 cannot be obtained through tokenization.

In the example of FIG. 2B, the language of the content 225 of the document 2 220 will be detected as Chinese and English characters in the content 225 will also be processed using Chinese rules, which means no proper root forms (alternative forms) will be generated for those English words. In this case, if the client 130 searches "search", the search engine 110 cannot hit the document 2. This is because if the language of the document 2 is detected as 'simplified Chinese' as an example, English characters are tokenized only, no stemming or lemmatization etc. will be applied. Therefore, only an exact original form of an English character will be indexed and searched (e.g., "searching") rather than its variant (e.g., search).

The multi-language text 141 is normally encoded with a Unicode by the content processing module 120. Unicode is a character encoding scheme formulated by an international organization for accommodating all texts and symbols in the world and sets a uniform and unique binary coding (i.e., an integer) for each character in each language to satisfy the demands of text conversion and processing across languages and platforms. Unicode usually comprises three transformation formats: UTF-8, UTF-16 and UTF-32, wherein UTF-8 is in bytes, UTF-16 is in 16-digit unsigned integers and UTF-32 is in 32-digit unsigned integers. In other words, each character in the multi-language text 141 can be represented by a unique Unicode according to an embodiment of the present disclosure. A character in the text corresponds to a code value in the Unicode representation of the multi-language text. Furthermore, one of characters of the same language is assigned with a Unicode within the same code value range.

The following table 1 provides a portion of the corresponding relationship between an code value range and a language type in a Basic Multilingual Plane (BMP) of the Unicode. A code value is presented in UTF-16 in Table 1.

TABLE 1

| code value range | Language |
| --- | --- |
| 0020-007F | Basic Latin |
| 0080-00FF | Latin-1 Supplement |
| 0100-017F | Latin extended-A |
| 0180-024F | Latin extended-B |
| 0250-02AF | IPA extensions |
| 02B0-02FF | Spacing modifier letters |
| 0300-036F | Combining diacritical marks |
| 0370-03FF | Greek |
| 0400-04FF | Cyrillic |
| 0530-058F | Armenian |
| 0590-05FF | Hebrew |
| 0600-06FF | Arabic |

TABLE 1-continued

| code value range | Language |
|---|---|
| 0900-097F | Devanagari |
| 0980-09FF | Bengali |
| 0A00-0A7F | Gurmukhi |
| 0A80-0AFF | Gujarati |
| 0B00-0B7F | Oriya |
| 0B80-0BFF | Tamil |
| 0C00-0C7F | Telugu |
| 0C80-0CFF | Kannada |
| 0D00-0D7F | Malayalam |
| 0E00-0E7F | Thai |
| 0E80-0EFF | Lao |
| 0F00-0FBF | Tibetan |
| 10A0-10FF | Georgian |
| 1100-11FF | Hangul Jamo |
| 1E00-1EFF | Latin extended additional |
| 1F00-1FFF | Greek extended |
| 2000-206F | General punctuation |
| 2070-209F | Superscripts and subscripts |
| 20A0-20CF | Currency symbols |
| 20D0-20FF | Combining diacritical marks for symbols |
| 2100-214F | Letterlike symbols |
| 2150-218F | Number forms |
| 2190-21FF | Arrows |
| 2200-22FF | Mathematical operators |
| 2300-23FF | Miscellaneous technical |
| 2400-243F | Control pictures |
| 2440-245F | Optical character recognition |
| 2460-24FF | Enclosed alphanumerics |
| 2500-257F | Box drawing |
| 2580-259F | Block elements |
| 25A0-25FF | Geometric shapes |
| 2600-26FF | Miscellaneous symbols |
| 2700-27BF | Dingbats |
| 3000-303F | CJK symbols and punctuation |
| 3040-309F | Hiragana |
| 30A0-30FF | Katakana |
| 3100-312F | Bopomofo |
| 3130-318F | Hangul compatibility Jamo |
| 3190-319F | Kanbun |
| 3200-32FF | Enclosed CJK letters and months |
| 3300-33FF | CJK compatibility |
| 4E00-9FFF | CJK unified ideographs: Han characters used in China, Japan, Korea, Taiwan and Vietnam |
| AC00-D7A3 | Hangul syllables |
| D800-DB7F | High surrogates |
| DB80-DBFF | High private use surrogates |
| DC00-DFFF | Low surrogates |
| E000-F8FF | Private use |
| F900-FAFF | CJK compatibility ideographs |
| FB00-FB4F | Alphabetic presentation forms |
| FB50-FDFF | Arabic presentation forms-A |
| FE20-FE2F | Combining half marks |
| FE30-FE4F | CJK compatibility forms |
| FE50-FE6F | Small form variants |
| FE70-FEFE | Arabic presentation forms-B |
| FF00-FFEF | Halfwidth and fullwidth forms |
| FFF0-FFFF | Special |

In general, a multi-language text may be split into a plurality of parts based on Unicode of the multi-language text according to an embodiment of the present disclosure and a content of each obtained text part belongs to one language or one class of language which is also referred to as a "language category". A language corresponding to each text part is used to perform linguistic processing on the text part, so as to improve linguistic processing quality of the multi-language text and enhances hit-rate of searching.

Figure 3:
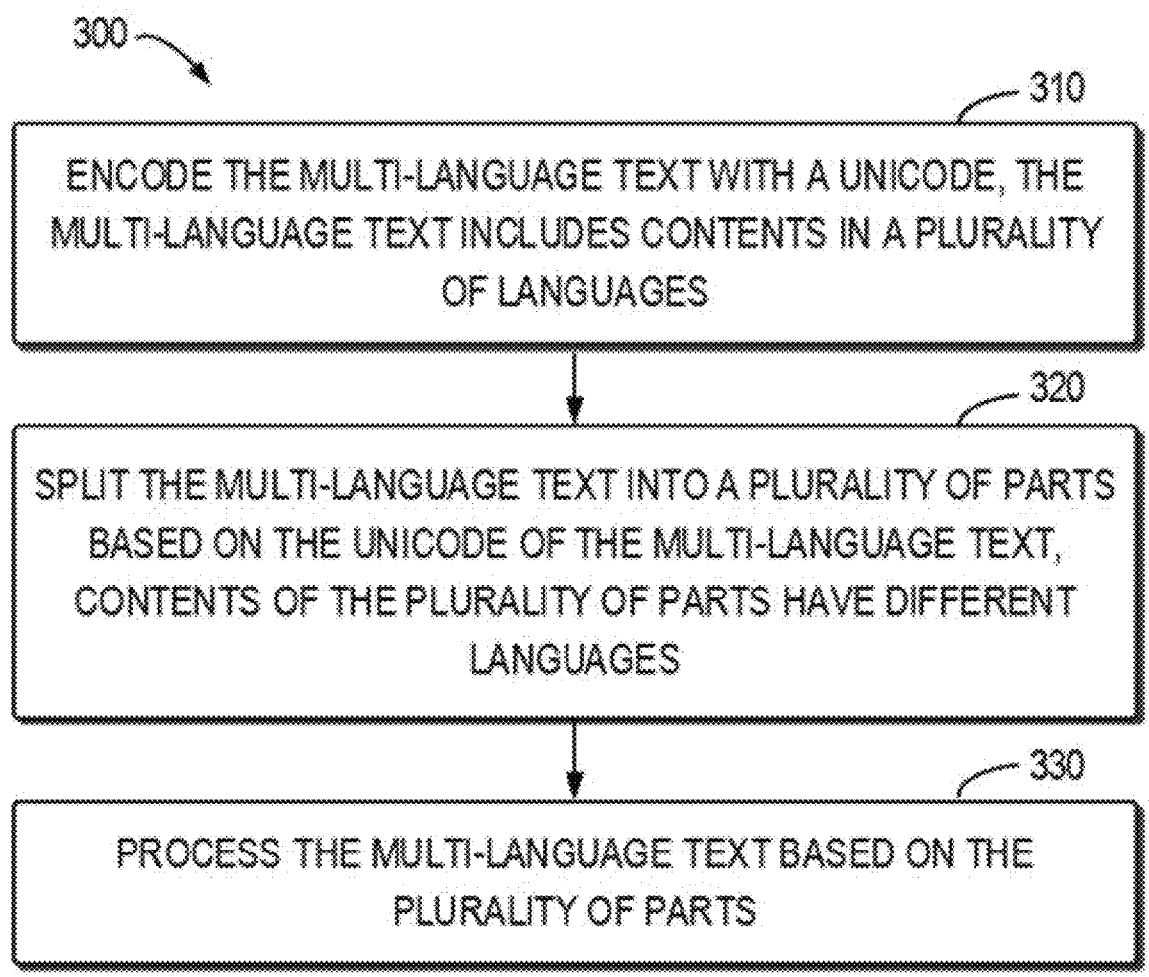
FIG. 3 shows a flowchart of a method for processing a multi-language text according to an embodiment of the present disclosure.

Embodiments of the present disclosure will be described in greater detail with reference to FIGS. 3 to 7. FIG. 3 shows a flowchart of a method 300 for processing a multi-language text according to an embodiment of the present disclosure. For example, the method 300 can be implemented by the content processing module 120 shown in FIG. 1. It should be understood that the method 300 may further include additional actions that are not shown and/or omit some acts as shown. The scope of the present disclosure is not limited in this regard.

At action 310, the content processing module 120 encodes the multi-language text with a Unicode, to obtain a Unicode representation of the multi-language text. The multi-language text includes contents in a plurality of languages. For example, the content 215 of the document 1 210 in FIG. 2A including an English front part and a Chinese latter part and the content 225 of the document 2 220 in FIG. 2B including a majority part of Chinese with English embedded.

The method 300 comes to action 320. In action 320, the content processing module 120 splits the multi-language text into a plurality of parts based on the Unicode of the multi-language text, contents of the plurality of parts having different languages. For this end, in some embodiments, the content processing module 120 may obtain a code value of the Unicode of the multi-language text, which code value corresponds to a content in the coded multi-language text. The content processing module 120 may determine a part of the plurality of parts to which the corresponding content belongs based on the code value. The code value is an integer, which is identical to the value of UTF-32. The content processing module 120 may match the code value with one of a plurality of code value ranges in a reference table such as the above table 1, wherein the plurality of code value ranges correspond to a plurality of languages or language categories. Based on the matching, the content processing module 120 may determine the part to which the content corresponding to the code value belongs. The content processing module 120 may determine the part to which the content corresponding to each code value of the Unicode of the multi-language text belongs.

In some embodiments, in response to determining that the code value and a previous code value belong to different code value ranges, the content processing module 120 splits the content corresponding to the code value into a new part of the plurality of parts, and the multi-language text is split at this point. Therefore, the range of a previous text part including a previous content corresponding to the previous code value may be obtained. In some embodiments, in response to determining that the code value and the previous code value belong to a same code value range, the content processing module 120 splits the content corresponding to the code value into a same part of the plurality of parts as a previous content corresponding to the previous code value.

Additionally or alternatively, in some embodiments, in response to determining that the code value belongs to a code value range corresponding to a common character, the content processing module 120 may also split the content corresponding to the code value into a same part of the plurality of parts as a previous content corresponding to a previous code value. The common character includes at least one of a punctuation or a numeric value.

In this manner, a code value is strictly matched to a particular code value range and a content corresponding to a code value is split into a particular text part which has a language or language category different from those of other text parts.

It should be noted that in some embodiments, the corresponding relationship between an code value range and a language type in the reference table such as Table 1 can be configurable. In the reference table, a code value range may correspond to a language. Furthermore, several code value ranges can also be combined, such that the combined code value range corresponds to a language category. In this way, the elaborate degree for splitting a multi-language text is controlled to balance a reduction in processing speed brought by text splitting.

As an example, a multi-language text can be split into text parts respectively corresponding to the six language categories shown in the following Table 2.

TABLE 2

| Language category | Language included |
|---|---|
| Latin category | English, German, French, Dutch, Czech, Hungarian, Spanish, Italian, Portuguese |
| Cyrillic category | Russian |
| Chinese-Japanese-Korean (CJK) category | Chinese, Japanese, Korean |
| Arabic category | Arabic |
| Hebrew category | Hebrew |
| Common character | Numeric value etc. |

In some embodiments, the multi-language text further includes a metadata. In such case, the content processing module 120 may receive an input to exclude the metadata from the splitting. In response to receiving the input, the content processing module 120 may split only the contents of the multi-language text into a plurality of parts. The metadata comprises author, keywords and creation date etc. of a document. As an example, if an input indicates grouping metadata for linguistic processing, the content processing module 120 will not split a multi-language text corresponding to the metadata, so as to provide an economically feasible operation.

Continue to refer to FIG. 3. In action 330, the content processing module 120 processes the multi-language text based on the plurality of parts. The content processing module 120 may detect a language of at least one part of the plurality of parts and process the at least one part based on the detected language. For example, in some embodiments, the content processing module 120 detects a language of each one of the plurality of parts obtained from splitting and processes each part with the detected corresponding language, so as to ensure a correct language analysis of each part. The content processing module 120 may aggregate processing results for each part as a processing result for the whole multi-language text for following search. For example, in one embodiment, the content processing module 120 can respectively process the plurality of parts obtained from splitting and merge a plurality of processed parts. Embodiments of this aspect will be further described below.

Figure 4A:
FIG. 4A and FIG. 4B show schematic diagrams of splitting the multi-language texts shown in FIGS. 2A-2B into a plurality of parts according to an embodiment of the present disclosure.
Figure 4B:
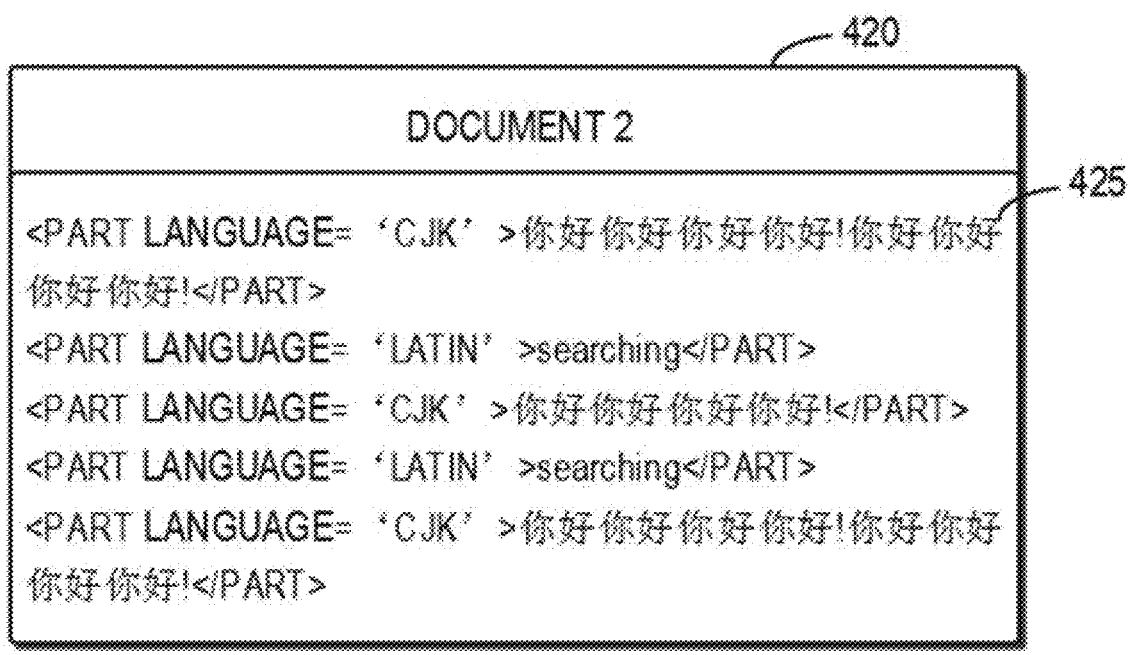

FIGS. 4A and FIG. 4B show schematic diagrams of splitting the multi-language texts shown in FIGS. 2A-2B into a plurality of parts according to an embodiment of the present disclosure. Content of document 1 410 in FIG. 4A is identical to the content 215 of the document 1 210 in FIG. 2A and block 415 shows a result of splitting the content of the document 1 410 by language. It is seen that the content of the document 1 410 is split into a first text part including English only and a second text part including Chinese only. In a following processing, the content processing module 120 will perform linguistic analysis on the first text part using English and on the second text part using Chinese, which enhances the reliability of a linguistic processing result. By this way, each word, phrase and variant thereof in the content of document 1 410 can be searched. Since the linguistic processing is performed using respective language rules, when the client 130 searches 你好 the search engine 110 can return a search result containing the document 1 410.

Content of document 2 420 in FIG. 4B is identical to the content 225 of the document 2 220 in FIG. 2B and block 425 shows a result of splitting the content of the document 2 420 by language. It is seen that the content of the document 2 420 is split into a first text part including Chinese only, a second text part including English only (specifically, only including a word "searching"), a third text part including Chinese only, a fourth text part including English only and a fifth text part including Chinese only. In a following processing, the content processing module 120 will perform linguistic analysis on the first, third and fifth text parts using Chinese and on the second and fourth text parts using English. Since the linguistic processing is performed using respective language rules, all kinds of variants of English words can be obtained. When the client 130 searches "search", the search engine 110 can return a search result containing the document 2 420.

Figure 5:
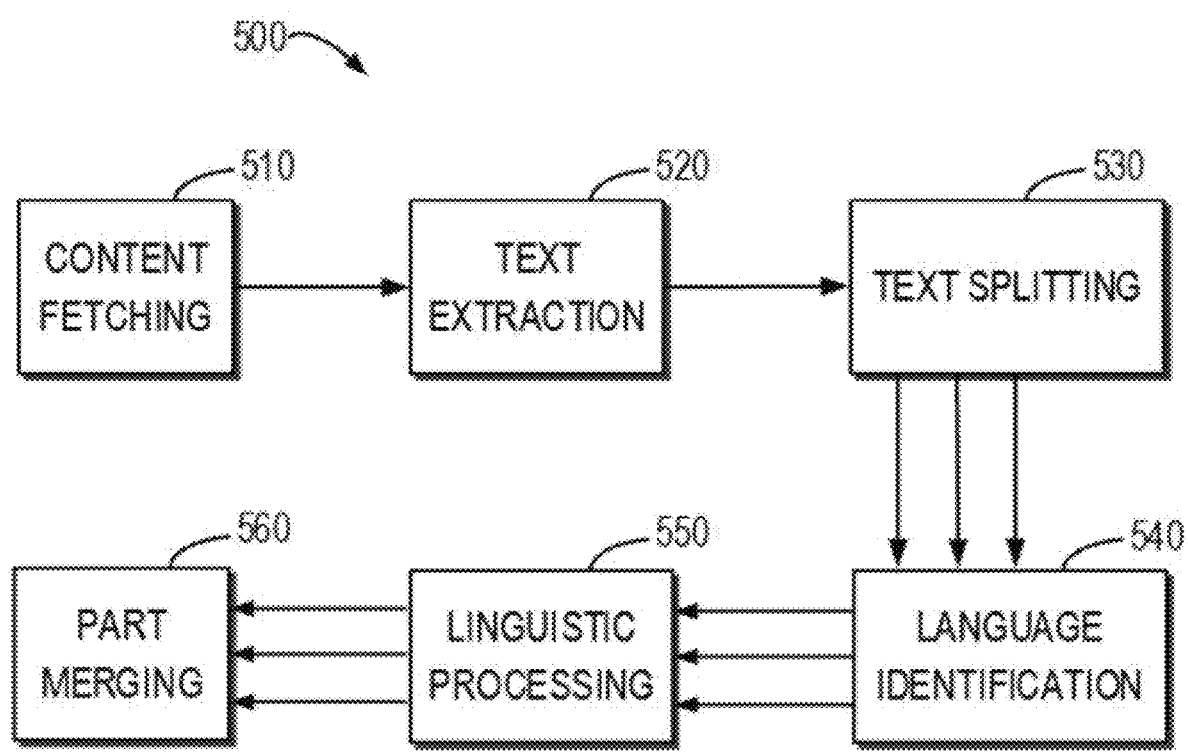
FIG. 5 shows a block diagram of a content processing flow including text splitting according to an embodiment of the present disclosure.

FIG. 5 shows a block diagram of a content processing flow 500 including text splitting according to an embodiment of the present disclosure. The content processing flow 500 can be implemented by the content processing module 120 shown in FIG. 1, which can be regarded as a specific implementation of the method 300 as described above with respect to FIG. 3. The content processing flow 500 including text splitting may comprise: content fetching 510, text extraction 520, text splitting 530, language identification 540, linguistic processing 550 and part merging 560.

The function module of content fetching 510 fetches contents from media files, such as text files and/or video files etc. to obtain a multi-language text. The function block of text extraction 520 encodes the fetched content into a Unicode representation of the multi-language text. Based on the Unicode of the multi-language text, the function block of text splitting 530 splits the multi-language text into a plurality of parts for a subsequent processing, e.g., a linguistic processing. Contents of the plurality of parts obtained from splitting have different languages. The function block of language identification 540 detects a language of at least one part of the plurality of parts of the multi-language text. The function block of linguistic processing 550 processes the at least one part based on the language detected by the function block of language identification 540. The at least one part may include two or more parts. The function block of part merging 560 merges the two or more parts that are processed.

In some embodiments, the function block of language identification 540 detects a language of each one of the plurality of parts of the multi-language text. The function block of linguistic processing 550 processes each part based on the corresponding language detected by the function block of language identification 540. The function block of part merging 560 merges each processed part into a single stream as a processing result of the whole multi-language text. As the merging involves token stream unmarshalling and marshalling, a little performance will be dropped when the content contained in the multi-language text is large. After the merging, a language of a first part of the multi-language text will be regarded as a language of the whole multi-language text.

In some embodiments, the function block of text splitting 530 may be implemented by a plugin. The function block of text splitting 530 may receive the Unicode representation of the multi-language text from the function block of text extraction 520 and generate the plurality of parts of the multi-language text. The function block of text splitting 530 may comprise a text part buffer for buffering an information regarding the Unicode and a position (e.g., start and end offset) of a text part in the original text. The plurality of split text parts will be sent to a plugin of language identification 540 for language detection. Then the function block of linguistic processing 550 will call corresponding linguistic processors to process the plurality of parts of the multi-language text.

In some embodiments, a plugin of text splitting 530 can be implemented by any of C++ language and Java language. It should be noted that this is only exemplary and bears no intention to limit the scope of the present disclosure in any way. Any currently known or to be developed high-level languages, assembly languages or even machine languages can all be utilized for implementing embodiments of the present disclosure. In one embodiment, considering the performance cost, a C++ text part buffer is utilized to store an intermediate result of text splitting 530. The content processing module 120 will read parts of the multi-language text one by one to perform linguistic processing on the parts and aggregate the processing results for the parts into a linguistic processing response.

For languages which must be processed by a Java-side plugin of linguistic processing 550 (like Hebrew), the plurality of parts of the multi-language text will be transferred to manager side to perform linguistic processing on Java.

During an initialization phase of the plug-in of text splitting 530, the above reference table (generally an XML file) is loaded, wherein the reference table comprises a corresponding relationship between an code value range and a language category. The reference table can be user-defined, i.e., the code value range may be combined or split to adjust the elaborate degree of language category splitting.

In some embodiments, a flag bit may be added to a request for content processing service, which flag bit tells the content processing flow 500 if text splitting is required or not. Alternatively or additionally, in order to have backward compatibility, text splitting may be disabled in a top-level configuration in some embodiments. Users can enable text splitting at a domain level underlying the top-level configuration, e.g., by setting a text splitting flag to have a Boolean value of "true".

After text extraction 520, if the text splitting flat is set as "true", a result of text extraction 520 will be routed to the plugin of text splitting 530 represented with a content buffer. In addition, a text part buffer is allocated to the plugin of text splitting 530. The plugin of text splitting 530 identifies each code value, gets its language information, and splits at a different language or language category code value, thereby obtaining the plurality of parts of the multi-language text. Once a text part is generated, the part is routed to the function blocks of language identification 540 and linguistic processing 550.

The multi-language text splitting according to embodiments of the present disclosure is helpful to distinguish languages corresponding to different code value ranges, like English-Chinese, French-Japanese, Hebrew-German and Arabic-Russian etc. Therefore, a multi-language text of a document can be split into several parts and the language of each part may be detected independently to finally perform corresponding linguistic processing on each part (its contents have the same language). Moreover, even it is hard to differentiate the languages within a same code value range, the situation of query failure will be significantly reduced. For example, even when some English terms are processed with French grammar, these terms can still be searched.

Furthermore, experiments have proved that text splitting performed by the content processing module 120 will not be a bottleneck of the system performance. Specifically, the disclosed text splitting method can improve linguistic process quality and index more effective information. The algorithm for text splitting just uses numeric comparison. For example, in some rare cases of non-BMP codes, a conversion from UTF-16 to UTF-32 will be performed. Moreover, the text is traversed linearly, so text splitting will not significantly degrade performance. Take a text splitting based on C++ language as an example, the following Table 3 shows the cost of splitting. It is clearly seen that a performance degrade caused by text splitting is acceptable.

TABLE 3

| Text Size (KB) | Text Structure Type | End to End Time (without text split) (s) | End to End Time (with text split) (s) | Split Cost (s) | Split Points | Split Cost in Linguistic Processing Cost | Average Cost Per Split Point (ms) |
| --- | --- | --- | --- | --- | --- | --- | --- |
| 110 | Bilingual bipolar, Chinese-English | 7.429 | 8.519 | 1.090 | 74 | 12.8% | 14.7 |
| 36 | Bilingual sentence-level parallel, Chinese-Russian | 7.569 | 9.021 | 1.452 | 203 | 16.1% | 7.14 |
| 228 | Bilingual sentence-level parallel, Chinese-Russian | 8.154 | 11.875 | 3.721 | 981 | 31.3% | 3.79 |
| 867 | Bilingual paragraph-level parallel, Chinese-English | 9.290 | 14.300 | 5.010 | 504 | 35.0% | 10.0 |

In Table 3, split cost includes the cost to identify a code value, identify language of each part and the additional call cost for linguistic processing. As a linguistic processing plugin is invoked multiple times for the plurality of text part, the performance will degrade, which increases linguistic processing time consequently. It is seen from Table 3: the average cost per split point will go down when the count of split points goes up, because of the fixed cost apportion by the count of split points. Furthermore, split cost percent (split cost in linguistic processing cost) goes up when the count of split points goes up, because the content processing module 120 takes more contents to linguistic processing and calls a plugin for linguistic processing more times.

Figure 6:
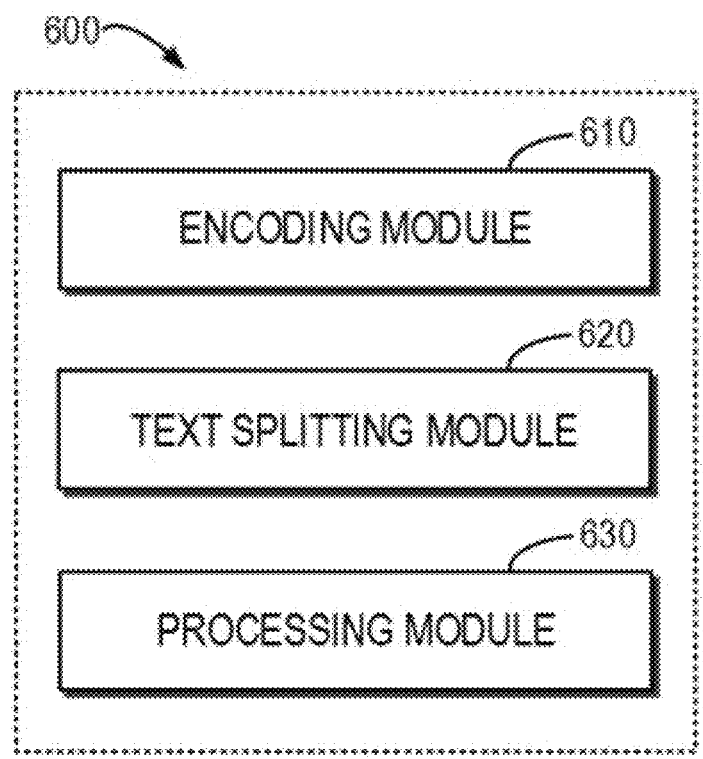
FIG. 6 shows a block diagram of a device for processing a multi-language text according to an embodiment of the present disclosure.

FIG. 6 shows a block diagram of a device 600 for processing a multi-language text according to an embodiment of the present disclosure. For example, the content processing module 120 can be implemented by the device 600. As shown in FIG. 600, the device 600 may comprise an encoding module 610 configured to encode a multi-language text with a Unicode, the multi-language text including contents in a plurality of languages. The device 600 may further comprise a text splitting module 620 configured to split the multi-language text into a plurality of parts based on the Unicode of the multi-language text, contents of the plurality of parts having different languages. Furthermore, the device 600 may also comprise a processing module 630 configured to process the multi-language text based on the plurality of parts.

In some embodiments, the text splitting module 620 comprises: an acquiring sub-module configured to obtain a code value of the Unicode of the multi-language text, the code value corresponding to a content in the coded multi-language text; and a determining sub-module configured to determine a part of the plurality of parts to which the corresponding content belongs based on the code value.

In some embodiments, the determining sub-module comprises: a matching unit configured to match the code value with one of a plurality of code value ranges in a reference table, the plurality of code value ranges corresponding to a plurality of languages; and a determining unit configured to determine the part to which the content corresponding to the code value belongs based on the matching.

In some embodiments, the determining unit comprises: a first splitting sub-unit configured to split the content corresponding to the code value into a new part of the plurality of parts in response to determining that the code value and a previous code value belong to different code ranges; and a second splitting sub-unit configured to split the content corresponding to the code value into a same part of the plurality of parts as a previous content corresponding to the previous code value in response to determining that the code value and the previous code value belong to a same code value range.

In some embodiments, the determining unit comprises: a third splitting sub-unit configured to split the content corresponding to the code value into a same part of the plurality of parts as a previous content corresponding to a previous code value in response to determining that the code value belongs to a code value range corresponding to a common character, which includes at least one of a punctuation and a numeric value.

In some embodiments, the multi-language text further comprises a metadata and the device 600 may also comprise: a receiving module configured to receive an input to exclude the metadata from the splitting and a further text splitting module configured to split only the contents of the multi-language text into a plurality of parts in response to receiving the input.

In some embodiments, the processing module 630 comprises: a detecting sub-module configured to detect a language of at least one part of the plurality of parts; and a processing sub-module configured to process the at least one part based on the detected language.

In some embodiments, the at least one part includes two or more parts, and the device 600 may also comprise a merging module configured to merge the two or more parts that are processed.

For the sake of clarity, certain optional modules of the device 600 are not shown in FIG. 6. However, it should be appreciated that the above features described with reference to FIGS. 1 and 3-5 are likewise applicable to the device 600. Furthermore, various modules of the device 600 may be hardware modules or software modules. For example, in some embodiments, the device 600 may be partially or completely implemented using software and/or firmware, e.g., implemented as a computer program product embodied on a compute readable medium. Alternatively or additionally, the device 600 may be partially or completely implemented based on hardware, for example, implemented as an integrated circuit (IC) chip, an application specific integrated circuit (ASIC), a system on chip (SOC), a field programmable gate array (FPGA) and so on. The scope of the present disclosure is not limited in this regard.

Figure 7:
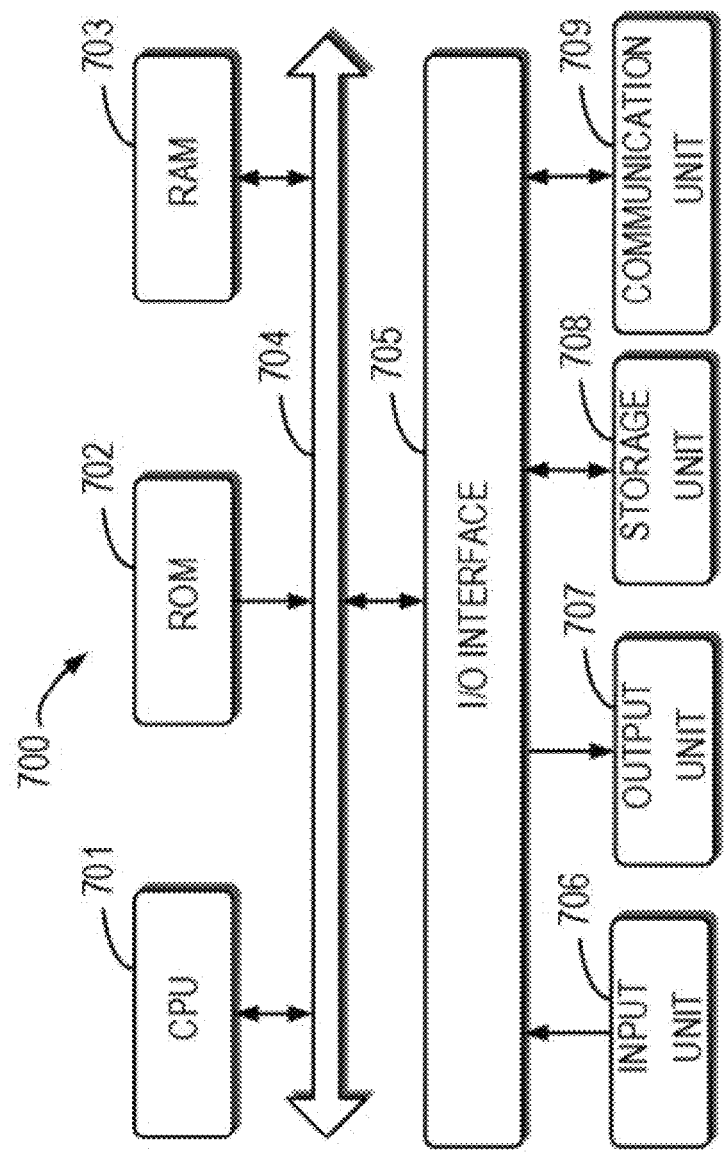
FIG. 7 shows a schematic block diagram of an example device that may be used to implement embodiments of the present disclosure.

FIG. 7 shows a schematic block diagram of an example device 700 that may be used to implement embodiments of the present disclosure. As shown in FIG. 7, the device 700 comprises a central processing unit (CPU) 701, which may perform various appropriate actions and processes based on computer program instructions stored in a read-only memory (ROM) 702 or computer program instructions loaded from a storage unit 708 to a random access memory (RAM) 703. In RAM 703, there are also stored various programs and data required by the device 700 when operating. The CPU 701, ROM 702 and RAM 703 are connected to one another via a bus 704. An input/output (I/O) interface 705 is also connected to the bus 704.

A plurality of components of the device 700 are connected to the I/O interface 705, comprising: an input unit 706 comprising a keyboard, a mouse, and the like; an output unit 707 such as various types of displays, loudspeakers, and the like; a storage unit 708 including a magnetic disk, an optical disk, and the like; and a communication unit 709 including a LAN card, a modem, a wireless communication transceiver and so on. The communication unit 709 allows the device 700 to exchange information/data with other devices via a computer network, such as the Internet, and/or various telecommunications networks.

The above-described procedures and processes, such as the method 300, can be implemented by the processing unit 701. For example, in some embodiments, the method 300 can be implemented as a computer software program which is tangibly embodied on a machine readable medium, for instance, the storage unit 708. In some embodiments, part or all of the computer program can be loaded to and/or installed on the device 700 via the ROM 702 and/or the communication unit 709. The computer program, when loaded to the RAM 703 and executed by the CPU 701, may execute one or more actions of the method 300 as described above. Alternatively, the CPU 701 can also be configured to implement the method 300 as described above in any other proper manner (for example, by means of firmware).

The solution of the present disclosure splits a multi-language text into a plurality of parts by means of the Unicode of the multi-language text (different languages using different code value ranges). This text splitting phase can improve linguistic processing quality when multiple languages are used and also improve the service quality of searching. The search system, which employs the solution of the present disclosure, can support dozens of languages, hundreds of file formats, effective security filtering and many other advanced search functions such as dynamic facet, thesaurus, spell check and wildcard.

The present disclosure may be a method, an apparatus, a system, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the present disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/action specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

We claim:

1. A method of processing a multi-language text, comprising:
    encoding the multi-language text in a document with a Unicode, the multi-language text including contents in a plurality of languages;
    splitting the multi-language text in the document into a plurality of parts by the plurality of languages used in the contents based on the Unicode of the multi-language text, contents of the plurality of parts having different languages, wherein splitting the multi-language text in the document into the plurality of parts comprises buffering, via a text part buffer, information regarding the Unicode and a position of a text part, of the plurality of parts, in at least a portion of original text, wherein splitting the multi-language text in the document into the plurality of parts comprises combining a plurality of code values, wherein the combined plurality of code values correspond to a language category; and
    processing the multi-language text based on the plurality of parts.

2. The method of claim 1, wherein splitting the multi-language text into a plurality of parts comprises:
    obtaining a code value of the Unicode of the multi-language text, the code value corresponding to a content in the coded multi-language text; and
    determining, based on the code value, a part of the plurality of parts to which the corresponding content belongs.

3. The method of claim 2, wherein determining, based on the code value, a part of the plurality of parts to which the corresponding content belongs comprises:
    matching the code value with one of a plurality of code value ranges in a reference table, the plurality of code value ranges corresponding to a plurality of languages; and
    determining, based on the matching, the part to which the content corresponding to the code value belongs.

4. The method of claim 3, wherein determining, based on the matching, the part to which the content corresponding to the code value belongs comprises:
    in response to determining that the code value and a previous code value belong to different code value ranges, splitting the content corresponding to the code value into a new part of the plurality of parts; and
    in response to determining that the code value and the previous code value belong to a same code value range, splitting the content corresponding to the code value into a same part of the plurality of parts as a previous content corresponding to the previous code value.

5. The method of claim 3, wherein determining, based on the matching, the part to which the content corresponding to the code value belongs comprises: in response to determining that the code value belongs to a code value range corresponding to a common character, splitting the content corresponding to the code value into a same part of the plurality of parts as a previous content corresponding to a previous code value.

6. The method of claim 5, wherein the common character includes at least one of a punctuation or a numeric value.

7. The method of claim 1, wherein the multi-language text further includes a metadata, the method further comprising:
    receiving an input to exclude the metadata from the splitting; and
    in response to receiving the input, splitting only the contents of the multi-language text into the plurality of parts.

8. The method of claim 1, wherein processing the multi-language text based on the plurality of parts comprises:
    detecting a language of at least one part of the plurality of parts; and
    processing the at least one part based on the detected language.

9. The method of claim 8, wherein the at least one part includes two or more parts, the method further comprising: merging the two or more parts that are processed.

10. An electronic device, comprising:
    at least one processing unit;
    at least one memory coupled to the at least one processing unit and storing instructions executable by the at least one processing unit, the instructions, when executed by the at least one processing unit, causing the device to:
    encode a multi-language text in a document with a Unicode, the multi-language text including contents in a plurality of languages;
    split the multi-language text in the document into a plurality of parts by the plurality of languages used in the contents based on the Unicode of the multi-language text, contents of the plurality of parts having different languages, wherein splitting the multi-language text in the document into the plurality of parts comprises buffering, via a text part buffer, information regarding the Unicode and a position of a text part, of the plurality of parts, in at least a portion of original text, wherein splitting the multi-language text in the document into the wherein splitting the multi-language text in the document into the plurality of parts comprises combining a plurality of code values, wherein the combined plurality of code values correspond to a language category; and
    process the multi-language text based on the plurality of parts.

11. The device of claim 10, wherein splitting the multi-language text into a plurality of parts comprises:
    obtaining a code value of the Unicode of the multi-language text, the code value corresponding to a content in the coded multi-language text; and
    determining, based on the code value, a part of the plurality of parts to which the corresponding content belongs.

12. The device of claim 11, wherein determining, based on the code value, a part of the plurality of parts to which the corresponding content belongs comprises:
    matching the code value with one of a plurality of code value ranges in a reference table, the plurality of code value ranges corresponding to a plurality of languages; and
    determining, based on the matching, the part to which the content corresponding to the code value belongs.

13. The device of claim 12, wherein determining, based on the matching, the part to which the content corresponding to the code value belongs comprises:
    in response to determining that the code value and a previous code value belong to different code value ranges, splitting the content corresponding to the code value into a new part of the plurality of parts; and
    in response to determining that the code value and the previous code value belong to a same code value range, splitting the content corresponding to the code value into a same part of the plurality of parts as a previous content corresponding to the previous code value.

14. The device of claim 12, wherein determining, based on the matching, the part to which the content corresponding to the code value belongs comprises: in response to determining that the code value belongs to a code value range corresponding to a common character, splitting the content corresponding to the code value into a same part of the plurality of parts as a previous content corresponding to a previous code value.

15. The device of claim 14, wherein the common character includes at least one of a punctuation or a numeric value.

16. The device of claim 10, wherein the multi-language text further includes a metadata, and the instructions, when executed by the at least one processing unit, further cause the device to:
receive an input to exclude the metadata from the splitting; and
in response to receiving the input, split only the contents of the multi-language text into the plurality of parts.

17. The device of claim 10, wherein processing the multi-language text based on the plurality of parts comprises:
detecting a language of at least one part of the plurality of parts; and
processing the at least one part based on the detected language.

18. The device of claim 17, wherein the at least one part includes two or more parts, and the instructions, when executed by the at least one processing unit, further cause the device to: merge the two or more parts that are processed.

19. A computer program product for processing a multi-language text, the computer program product comprising:
a non-transitory computer readable medium encoded with computer-executable program code for using read signatures in replication, the code configured to enable the execution of:
encoding the multi-language text in a document with a Unicode, the multi-language text including contents in a plurality of languages;
splitting the multi-language text in the document into a plurality of parts by the plurality of languages used in the contents based on the Unicode of the multi-language text, contents of the plurality of parts having different languages, wherein splitting the multi-language text in the document into the plurality of parts comprises buffering, via a text part buffer, information regarding the Unicode and a position of a text part, of the plurality of parts, in at least a portion of original text, wherein splitting the multi-language text in the document into the wherein splitting the multi-language text in the document into the plurality of parts comprises combining a plurality of code values, wherein the combined plurality of code values correspond to a language category; and
processing the multi-language text based on the plurality of parts.

20. The method of claim 9 wherein merging the two or more parts that are processed includes merging each processed part of the two or more parts into a single stream as a processing result of an entirety of the multi-language text.

* * * * *